United States Patent [19]
Griffiths

[11] 3,907,267
[45] Sept. 23, 1975

[54] APPARATUS FOR ASSEMBLY OF EVAPORATOR TUBING TO LINER

[75] Inventor: Leslie N. Griffiths, Tarvin, England

[73] Assignee: Kelvinator, Inc., Grand Rapids, Mich.

[22] Filed: Nov. 23, 1973

[21] Appl. No.: 418,245

Related U.S. Application Data

[62] Division of Ser. No. 203,590, Dec. 1, 1971, Pat. No. 3,799,831.

[52] U.S. Cl. ............. 269/8; 29/157.3 C; 29/202 R; 269/47
[51] Int. Cl.² ......................................... B25B 11/00
[58] Field of Search ........................... 269/8, 47–52; 279/1 M; 29/200 P, 200 J, 203 J, 211 M, 157.3 C, 202 R; 165/171; 62/516

[56] References Cited
UNITED STATES PATENTS

| | | | |
|---|---|---|---|
| 1,025,318 | 5/1912 | Sharp | 269/8 |
| 2,217,048 | 10/1940 | Floss | 269/8 X |
| 2,734,120 | 2/1956 | Sensenig | 269/48.1 X |
| 3,079,191 | 2/1963 | Engelsted et al. | 269/8 X |
| 3,229,765 | 1/1966 | Phillips | 29/157.3 C |

*Primary Examiner*—Granville Y. Custer, Jr.
*Assistant Examiner*—Neil Abrams
*Attorney, Agent, or Firm*—McNenny, Farrington, Pearne & Gordon

[57] ABSTRACT

A method and apparatus for assembling tubing to a supporting and heat exchanging wall for heat transfer therebetween by which the tubing is prepositioned on the wall and held by a releasable holding force until an adhesive or cementitious binder material permanently secures the tubing to the wall with sufficient strength to retain the tubing in the desired position after removal of the holding force. In refrigeration apparatus, evaporator tubing may be assembled on the exterior walls of a boxlike liner by temporarily holding it in position with a magnetic field provided by a magnet carrying male fixture formed to fit the interior of the liner, coating the liner exterior and tubing with a binder, such as by dipping it in a molten thermoplastic and allowing the thermoplastic to set by cooling, and removing the male fixture.

9 Claims, 5 Drawing Figures

APPARATUS FOR ASSEMBLY OF EVAPORATOR TUBING TO LINER

This application is a division of application Ser. No. 203,590, filed Dec. 1, 1971 now U.S. Pat. No. 3,799,831.

FIELD OF THE INVENTION

This invention concerns the manufacture of heat exchanger wall panels such as found in refrigeration cabinets, and, in particular, relates to a method and apparatus for assembling refrigeration tubing to a supporting and heat exchanging wall.

The invention is particularly adapted to be used in assembling evaporator tubing to the liner or inner wall of refrigeration apparatus, such as a refrigerator, freezer, or cooler. Evaporator tubing is normally arranged in contact with the liner along its length so that evaporation of refrigerant in the tubing extracts heat through the liner to cool the interior of the apparatus.

DESCRIPTION OF THE PRIOR ART

According to a previous method of assembling evaporator tubing to a liner, tubing, usually arranged in continuous coils, is positioned over the exterior surface of the liner and fastened at intervals with bridge-like clips spot welded to the exterior surface of the liner. Besides permanently holding the tubing on the liner, the clips serve to conduct heat between the liner and tubing.

Steel evaporator tubing, widely used because of its relatively low cost, is subject to corrosion and must be protectively coated after fastening steel tubing with the clips. For example, the outer surfaces of the resulting assembly of the tubing and liner are protected from moisture and corrosion by dipping the assembly into a tank of bitumen in a molten state at an elevated temperature. The assembly is removed from the tank with a generally uniform coating of bitumen on its exterior and is subsequently allowed to cool before further use.

Besides the labor required to position and weld clips onto the liner, this prior method of fastening the tubing has the disadvantage of not being well suited for use with various liner materials, such as aluminum, which are relatively difficult to weld.

SUMMARY OF THE INVENTION

The invention provides a method and apparatus for temporarily holding refrigeration tubing on a supporting and heat exchanging wall. Tubing is held in substantially uniform heat exchanging contact with the wall by a releasable magnetic field until the tubing is permanently cemented into position on the wall. Preferably, in accordance with the invention, the coating material used to permanently cement or adhere the tubing to the wall is, at the same time, used to protect the tubing and wall from corrosion.

In the preferred embodiment, a thermoplastic material, such as bitumen, is provided in a molten condition. Tubing is arranged on a refrigeration wall and held in a desired position by the magnetic field. The assembly, including the source of the magnetic field, may be dipped into the molten thermoplastic and then removed and allowed to cool to provide a substantially uniform coating on the wall and tubing which permanently holds these members in contact. It has been found that heat conduction between the tubing and wall assembled in this manner is substantially the same as that resulting from the prior welded clip assembly method.

The refrigeration walls may be assembled in the form of a boxlike structure or liner having at least one open side. A suitable magnetic field for temporarily holding evaporator tubing on the sides of the liner box is produced according to the invention by arranging permanent magnets in a fixture constructed to fit into the liner box through its open side. The magnet supporting fixture is a male form dimensioned to fit into the liner box. The fixture supports a plurality of permanent magnets parallel to and slightly inward from the planes of its walls to produce a uniform holding force and to prevent removal forces from becoming excessive. According to one embodiment of the invention, the magnets may be retractably mounted on the support fixture to substantially eliminate any magnetic attraction between the magnet, liner, and tubing during insertion and withdrawal of the supporting structure.

A principal advantage of the invention is the reduction of the manufacturing cost of tubing and liner assemblies by eliminating labor and equipment associated with previously used methods of assembly. Additionally, the invention permits the use of any practical liner material, since it is not limited to easily welded materials, nor is it limited to magnetic materials.

DESCRIPTION OF THE PREFERRED EMBODIMENT

Figure 1:
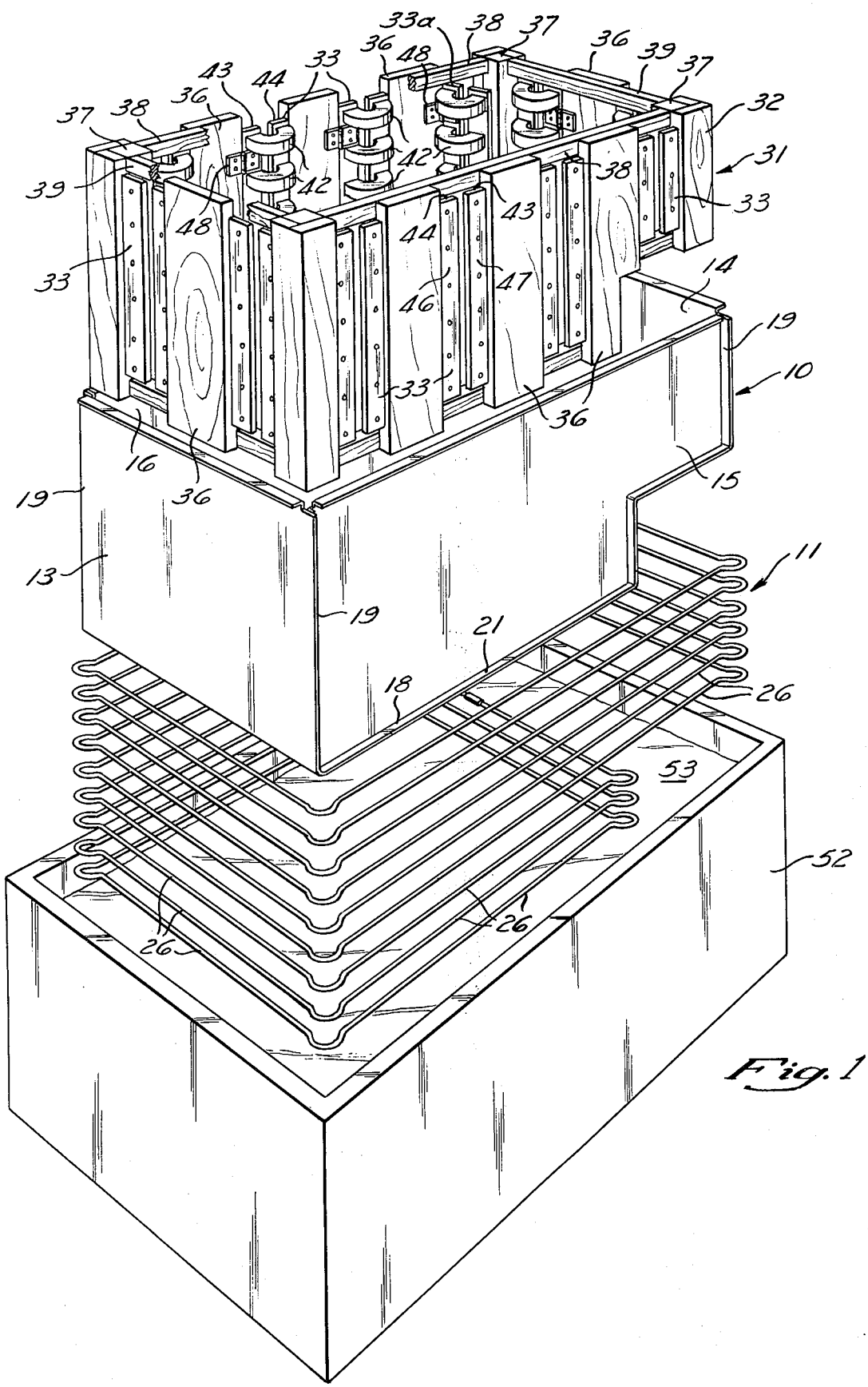
FIG. 1 is a perspective view of the liner, evaporator tubing, and a magnetic core assembly in vertical alignment with a dipping tank.
Figure 2:
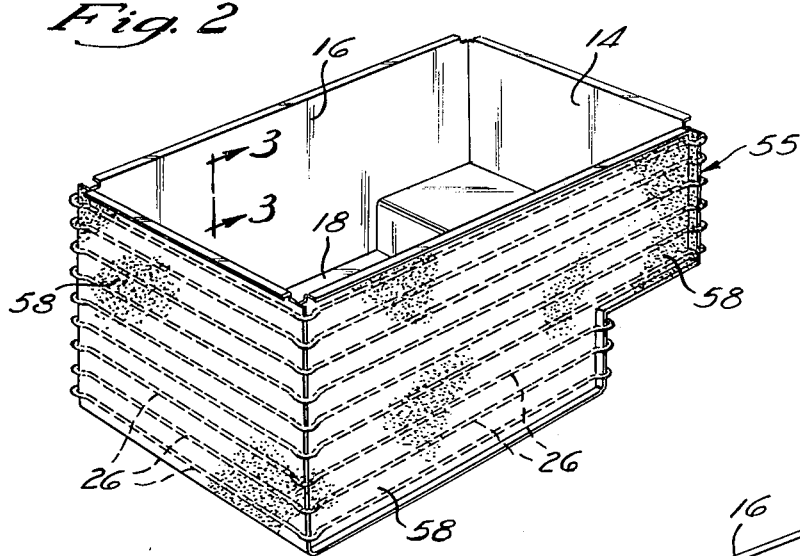
FIG. 2 shows a finished liner assembly produced from evaporator tubing and a liner such as shown in FIG. 1.
Figure 4:
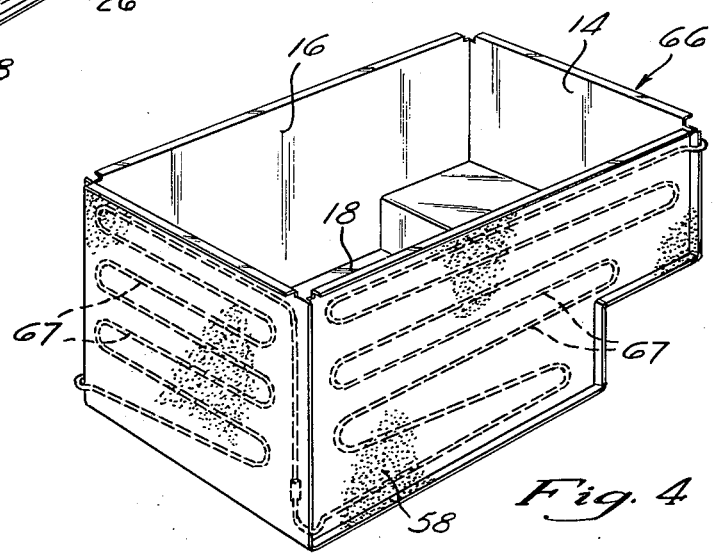
FIG. 4 is a perspective view of a finished liner assembly similar to that shown in FIG. 2 but with a different evaporator coil configuration.

Referring now to the drawings, FIG. 1 shows a liner assembly 10 for a refrigeration apparatus and, immediately below it, evaporator tubing 11 adapted to be positioned around the liner assembly. The liner assembly 10 is a boxlike structure having end sidewalls 13 and 14 and sidewalls 15 and 16. The upper side of the boxlike liner assembly 10, as viewed in FIGS. 1, 2, and 4, is open, while the opposite side is provided with a bottom wall 18. Each wall or panel 13–16 is constructed of sheet material with its edges turned over to form either a tongue or an interengaging groove at a junction 19 between abutting edges of the sidewalls 13–16 and at a junction 21 between the sidewalls 15 and 16 and the bottom wall 18. As shown, the end sidewalls 13 and 14 and the bottom wall 18 may be an integral sheet bent generally into a U-shape. The sidewalls 13–16, bottom wall 18, and the open side of the liner assembly 10 define the general shape of a polyhedron having its opposed sides parallel to one another and adjacent sides perpendicular.

The evaporator tubing 11 is preferably formed of steel or other magnetically attractable material, and comprises a plurality of straight tube portions 26 adapted to run along each sidewall 13–16 of the liner assembly 10. These generally straight tubing portions 26 are normally continuous with one another and form a basketlike structure which may be fitted over the liner assembly 10.

A magnetic core assembly 31, constructed in accordance with the invention, is illustrated in the upper portion of FIG. 1. The magnetic core assembly 31 has a rectangular, blocklike structure which is adapted to fit into the interior of the liner assembly 10 with a slight clearance. The magnetic core assembly 31 comprises a support structure 32 and a plurality of spaced magnet assemblies 33 supported thereon. As shown in FIG. 1, the support structure 32 is similar in form to a cage, and comprises a plurality of spaced vertical supports 36 and vertical end members 37. These vertical elements 36 and 37 are held in position by suitable longitudinal frame members 38 and crossover frame members 39 at the upper and lower portions of the support structure 32. Preferably, the members 36–39 comprising the support structure 32 are formed of a non-magnetic material, such as wood, to prevent magnetic interaction between the support structure 32 and the magnets 33.

The magnet assemblies 33 each comprise, preferably, a plurality of permanent horseshoe-type magnets 42 in vertical alignment and secured to a pair of steel poles 43 and 44. The horseshoe magnets 42 of each magnet assembly 33 are aligned according to polarity with the north pole of each horseshoe magnet 42 contacting a common vertical pole 43 and the south pole of each contacting the opposite pole 44. The permanent magnet assemblies 33 intervene between the spaced vertical supports 36 of the support structure 32. The magnet assemblies 33 are pivotally mounted on adjacent vertical supports 36 with hinges 48 suitably fastened on the vertical supports 36 and on one of the elongated vertical poles 44. Each elongated vertical pole 43 and 44 of the permanent magnets 33 provides a face 46 and 47 which lies slightly inward of the outer faces of the vertical supports 36 when the magnets 33 are in their extended or operative positions. Thus, when the magnetic core 31 is positioned in the liner assembly 10, these faces 46 and 47 do not touch the liner so that high retraction or stripping forces are not required to remove or retract these magnets from their operative positions.

There is provided a dipping tank 52 containing, preferably, molten thermoplastic material 53, such as bitumen, and being sufficiently large to fully receive the liner assembly 10 with the evaporator tubing 11 secured to the exterior of its sidewalls 13–16 by the magnetic core assembly 31 in a manner described below.

In reference to the embodiment illustrated in FIG. 1, the procedure for permanently assembling the evaporator tubing 11 to the liner assembly 10 begins with the prepositioning of the evaporator tubing on the liner assembly 10. With the magnet assemblies 33 all in a retracted position such as that occupied by the magnet assembly 33a, the magnetic core assembly 31 is lowered into the liner assembly 10 by a hoist or the like. In their retracted positions, all parts of each magnet assembly 33 are at least about one-half inch away from the liner 10. The magnet assemblies 33 are then all moved manually or with suitable power means into their operative positions parallel to and confronting the inner sides of the liner sidewalls 13–16. Ideally, the magnetic poles 46 and 47 of each magnet 33 extend in a direction transverse to the longitudinal direction of the lengths or portions 26 of the evaporator tubing 11 to maximize the magnetic attraction and uniformly hold each portion 26.

Magnets suitable in magnetic strength pull the tubing portions 26 into continuous contact with the exterior sides of the liner sidewalls or panels 13–16. It may be appreciated that, owing to the magnetic permeability of steel, the evaporator tubing 11 will be more tightly held against the walls of the liner assembly 10 if they are constructed of steel rather than of a nonmagnetic material. Nevertheless, it has been found that commercially available permanent magnet assemblies are adequate in strength to satisfactorily hold steel evaporator tubing in intimate continuous contact with aluminum liner sidewalls. A specific example of a suitable magnet assembly is a "Magna Rail" type 31-3 available from South Wales Eriez Magnetics of Blackwood Mon. U.K. This magnetic assembly has a magnetic strength sufficient to hold a steel test bar (⅛ × 1 × 3 inches) through a ¼ inch thickness of rubber placed on the face of the magnet, with a force of approximately 78 ounces.

Figure 3:
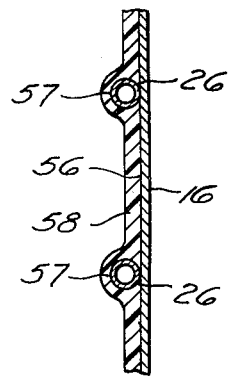
FIG. 3 is a fragmentary cross sectional view of the evaporator liner assembly taken along the line 3—3 indicated in FIG. 2.

With the magnetic core 31 securely holding the evaporator tubing 11 on the liner sidewalls 13–16, the core 31, liner 10, and tubing 11 are lowered into the tank 52 of molten bitumen 53 until substantially all of the tubing is immersed. The magnetic core 31 may be weighted with suitable material to facilitate immersion of the liner 10 to the correct depth. The magnetic core 31, liner 10, and tubing 11 are subsequently withdrawn from the tank carrying a bitumen coating 58, one-half to one-sixteenth inch thick, for example, on the exterior of the liner and tubing. The coating is allowed to set by cooling for a period of time before the magnets 33 are retracted and the magnetic core 31 is withdrawn. The resulting evaporator tubing and liner assembly, designated 55, is shown in FIG. 2. FIG. 3 shows a portion of the liner and tubing assembly 55 in cross section. As shown, the outer surface 56 of the liner sidewall 16 and the outer surface, designated 57, of each length of tubing 26 are fully covered by the bitumen coating.

While the number of materials adapted to permanently adhere or cement the tubing 11 to the liner 10 is practically unlimited, it has been found that, owing to the protection it affords as a permanent barrier against corrosion of the tubing under adverse moisture conditions, bitumen is particularly suited for this application. A specific example of such a substance is a blown oxidized grade of bitumen supplied by Shell-Mex and B. P. Ltd., of London, England, having the following properties determined according to TEST METHODS FOR BITUMEN, British Standard 3235, British Standards Institution, and marketed under the trade name "Mexphalte" with the grade name R85-40:

| MEXPHALTE BITUMEN | |
| --- | --- |
| Grade Name | R85/40 |
| Penetration at 25° C. (77° F.) | 35/45 |
| Softening Point (R & B) °C. | 80/90 |
| Softening Point (R & B) °F. | 176/194 |
| Ductility (cms.) at 15° C. (59° F.) min. | — |
| Ductility (cms.) at 25° C. (77° F.) min. | 3 |
| Loss on Heating % wt. 5 hrs. at 163° C. (325° F.) max. | 0.5 |
| Drop in penetration after heating % max. | — |
| Flash point (Cleveland Open Cup) °C. min. | 200 |
| Flash point (Cleveland Open Cup) °F. min. | 392 |
| Solubility of Carbon Disulphide % wt. min. | 99.5 |
| Ash Content % wt. Max. | 0.5 |

-Continued

MEXPHALTE BITUMEN

| Grade Name | R85/40 |
| --- | --- |
| Specific Gravity at 25/25° C. (77/77° F.) | 1.00/1.05 |
| Temperature of dipping tank | 180° C.) |
| | 365° F.) |

With this example, dipping usually lasts on the order of 2 minutes and cooling on the order of 5 minutes when the bath temperature is approximately 150° F. above its melting point, i.e., 176° to 194° F. Other suitable non-metallic organic materials besides bitumen may, of course, be used as a medium to bind, by adhering, cementing, or the like, the tubing to the liner walls.

FIG. 4 shows a liner and tube assembly 66 similar to the assembled article 55 of FIG. 2 but with a different tubing arrangement. In this construction, evaporator tubing is arranged in continuous, substantially straight portions 67, which for the most part do not extend around the corners of the liner. The continuous straight portions 67 form coils which are referred to as the panel type. These coils may be placed in position after the magnetic core 31 has been placed in the liner.

Figure 5:
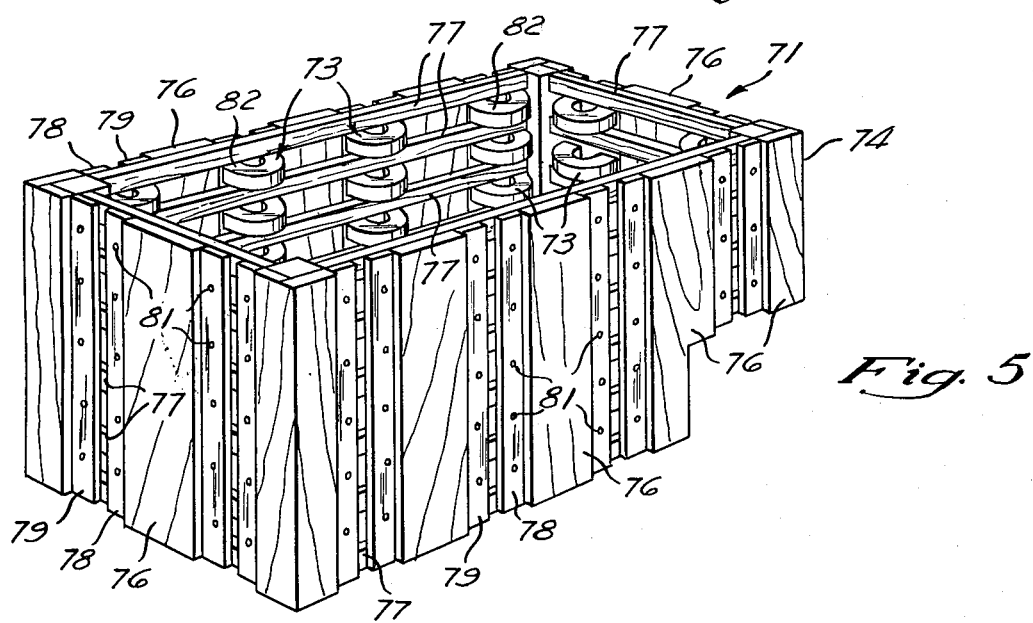
FIG. 5 shows a second embodiment of a magnetic core assembly similar to that shown in FIG. 1.

FIG. 5 illustrates another embodiment of a magnetic core assembly 71 in accordance with the invention which differs from the embodiment as shown in FIG. 1 in that the permanent magnets, designated 73, are non-retractable relative to the support structure, designated 74. The construction of the magnetic core 71 is similar to that described above for the magnetic core 31 having retractable magnets 33. The support structure 74 is preferably formed of wood or other non-magnetic material and comprises a plurality of vertical spaced panels 76 and a plurality of horizontal spaced stringers 77 suitably fastened to the vertical panels 76. The magnets 73 each comprise a pair of elongated vertical steel poles 78 and 79 secured to the stringers 77 with screws 81. Horseshoe magnets 82, magnetizing the poles 78 and 79, extend through the spacing between the horizontal stringers 77, while the poles 78 and 79 lie in the spaces between the vertical panels 76. Here, as in the operable position of the magnets 33 of the embodiment of FIG. 1, the outer faces of the magnet poles 78 and 79 are slightly inward of the planes containing the vertical panels 76. This magnetic core 71 is used in the same manner as that described above, with the exception that the magnets are not retracted or extended relative to the support structure 74. Under ordinary circumstances, this somewhat simplified embodiment of the magnetic core has proven to be satisfactory in use.

The foregoing description is necessarily detailed in character so that the invention may be completely set forth, but it will be understood that modifications may be made in its construction and details without departing from the principles and spirit of the invention.

What is claimed is:

1. A fixture for assembling steel refrigeration tubing to the walls of a boxlike liner of a refrigeration apparatus comprising a rectangular liner surrounding a nonmagnetic rectangular male support structure, said support structure being adapted to be inserted in and removed from the liner, said support structure defining at least four sidewalls having exterior dimensions slightly less than the interior dimensions of the liner walls to provide a slight working clearance for facilitating the positioning of the support structure in the liner, said support structure including means to mount magnets thereon, a plurality of magnets supported on a plurality of said sidewalls of said support structure by said mounting means, said mounting means being adapted to hold said magnets in parallel relation to the walls of said liner, a plurality of interconnected lengths of steel evaporator tubing on a plurality of exterior faces of the liner associated with the sidewalls of said support structure on which said magnets are supported, said magnets temporarily holding said steel evaporator tubing in intimate continuous contact with the exterior faces of the liner.

2. A fixture as defined in claim 1, wherein said mounting means holds said magnets inward from the planes defined by said sidewalls to prevent excessive attraction forces and consequent excessive stripping forces.

3. A fixture as defined in claim 1, wherein said mounting means permits inward movement of said magnets relative to said support structure.

4. Apparatus for assembling steel refrigeration tubing to the outside wall surfaces of a boxlike refrigeration liner, comprising a rectangular male support structure, a rectangular liner surrounding said support structure, said support structure being adapted to be inserted in and removed from the liner, a plurality of magnetic poles mounted on said support structure, said magnetic poles extending along planes substantially parallel to and coextensive with a plurality of the liner walls when the support structure is in the liner, a plurality of interconnected lengths of steel evaporator tubing on a plurality of exterior faces of the liner associated with said planes of said magnetic poles, said magnetic poles temporarily holding said steel evaporator tubing in intimate continuous contact with the exterior faces of the liner, and means for varying force of attraction between said magnetic poles and the tubing when the support structure is in the liner.

5. An apparatus as set forth in claim 4, wherein a plurality of magnetic poles are provided in a substantially planar array for each of said plurality of liner walls.

6. An apparatus as set forth in claim 5, wherein said magnetic poles are elongated elements extending parallel to one another in each array.

7. An apparatus as set forth in claim 6, wherein said elongated pole elements of all of said arrays are substantially parallel to one another.

8. Apparatus as set forth in claim 7, wherein said support structure includes means for supporting said magnetic poles for movement towards and away from their associated liner walls when said support structure is in said liner.

9. Apparatus for assembling evaporator refrigeration tubing to the outside surfaces of the walls of a boxlike refrigeration liner, comprising a nonmagnetic rectangular support structure, a boxlike liner surrounding said support structure, said support structure being adapted to be inserted in and removed from the liner, a plurality of interconnected lengths of steel evaporator tubing on a plurality of exterior faces of the liner, said support structure having a plurality of faces corresponding in number and orientation to the number and orientation of the exterior faces of the liner walls covered by said refrigerant tubing, a plurality of elongated, magnetic poles mounted on each of said support structure faces, the longitudinal axes of said poles lying in directions parallel to the faces of their associated support structure faces, said magnetic poles extending longitudinally substantially across the width of their associated support structure faces, said magnetic poles temporarily holding said steep evaporator tubing in intimate continuous contact with the exterior faces of the liner.

\* \* \* \* \*